(12) United States Patent
Weh et al.

(10) Patent No.: US 8,042,884 B2
(45) Date of Patent: Oct. 25, 2011

(54) HYDRAULIC VEHICLE BRAKE SYSTEM HAVING A SERVICE BRAKE WHICH CAN BE ACTUATED BY MUSCLE FORCE AND HAVING A DEVICE FOR REGULATING THE WHEEL SLIP

(75) Inventors: Andreas Weh, Sulzberg (DE); Juergen Tandler, Fuessen (DE)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 12/303,787

(22) PCT Filed: Apr. 25, 2007

(86) PCT No.: PCT/EP2007/054051
§ 371 (c)(1),
(2), (4) Date: Dec. 8, 2008

(87) PCT Pub. No.: WO2007/141092
PCT Pub. Date: Dec. 13, 2007

(65) Prior Publication Data
US 2010/0244552 A1     Sep. 30, 2010

(30) Foreign Application Priority Data
Jun. 6, 2006  (DE) .................. 10 2006 026 155

(51) Int. Cl.
*B60T 8/32*     (2006.01)

(52) U.S. Cl. .................. 303/116.1; 303/113.2
(58) Field of Classification Search .............. 303/10, 303/113.4, 116.1–116.4, 87, DIG. 11, 113.2
See application file for complete search history.

(56) References Cited

U.S. PATENT DOCUMENTS

| | | | |
|---|---|---|---|
| 5,152,586 A | | 10/1992 | Burgdorf |
| 5,174,636 A | * | 12/1992 | Burgdorf et al. ........... 303/116.1 |
| 5,188,437 A | | 2/1993 | Willmann |
| 5,246,280 A | * | 9/1993 | Sigl ............................. 303/113.2 |
| 5,288,142 A | * | 2/1994 | Burgdorf .................... 303/113.2 |
| 5,390,995 A | | 2/1995 | Zirps |
| 5,411,326 A | | 5/1995 | Linhoff |
| 5,564,798 A | * | 10/1996 | Zaviska et al. ............. 303/116.1 |
| 5,927,828 A | * | 7/1999 | Beck .......................... 303/116.2 |

* cited by examiner

*Primary Examiner* — Christopher Schwartz
(74) *Attorney, Agent, or Firm* — Ronald E. Greigg (57) ABSTRACT

The invention relates to a hydraulic vehicle brake system having a service brake which can be actuated by muscle force and having a device for regulating the wheel slip. It is proposed in such a vehicle brake system to use suction pumps in connection with specially-designed accumulators. The accumulators have separating elements which in each case separate a first accumulator chamber from a second accumulator chamber. An inflow opens out into the first accumulator chamber, and an outflow, which is separate from the inflow, outlets out of the first accumulator chamber. The separating element is arranged so as to be freely movable between two end positions, and in one of its end positions, blocks a pressure medium connection of the inflow to the outflow.

17 Claims, 5 Drawing Sheets

HYDRAULIC VEHICLE BRAKE SYSTEM HAVING A SERVICE BRAKE WHICH CAN BE ACTUATED BY MUSCLE FORCE AND HAVING A DEVICE FOR REGULATING THE WHEEL SLIP

CROSS-REFERENCE TO RELATED APPLICATION

This application is a 35 USC 371 application of PCT/EP 2007/054051 filed on Apr. 25, 2007.

BACKGROUND OF THE INVENTION

1. Field of the Invention

The invention is based on a hydraulic vehicle brake system having a service brake that can be actuated by muscle force and having a device for regulating wheel slip.

2. Description of the Prior Art

Wheel-slip-regulated vehicle brake systems are understood hereinafter to mean anti-lock vehicle brake systems (ABS), vehicle brake systems with traction control (TC), or vehicle brake systems with an electronic stability program (ESP). Such vehicle brake systems have a hydraulic unit connected between a master cylinder, which is actuatable by the driver, and at least one wheel brake. This hydraulic unit is equipped with, among other elements, magnetically actuatable multi-way valves, pumps, a pump drive, and reservoirs that supply the pumps with pressure fluid. For actuating the pump drive, a drive motor is also present. Via an electronic control unit, the drive motor and the multi-way valves can be triggered for regulating the pressure in the wheel brakes as needed. Detailed information going beyond this can be found in the discussion in the brochure entitled "*Fachwissen Kfz-Technik, Sicherheits-und Komfortsysteme, Fahrstabilisierungssysteme*" [Automotive Technology, Safety and Comfort Systems and Stabilizing Systems], *Gelbe Reihe* [Yellow Series], 2004 Edition, Robert Bosch GmbH, Stuttgart, ISBN 3-7782-2026-8, in particular beginning on page 90.

The vehicle brake systems described therein are similar to one another in terms of the layout of their hydraulic circuit diagram, but they differ in their engineering effort and expense depending on the scope of their function. In practice, for instance, different structural forms of pumps and/or a greater or lesser number of differently designed multi-way valves are used in order to achieve whatever functionality is wanted. Anti-lock vehicle brake systems, for instance, make do with non-self-aspirating pumps, known as return pumps. The object of these pumps, in a braking event involving existing wheel slip, is to pump pressure fluid from an affected wheel brake back to the master cylinder in order to lower the brake pressure. Since because of the actuation of the master cylinder by the driver taking place at that time the pressure fluid in the wheel brake is already at elevated pressure, the pump itself need not perform any suction work.

Vehicle brake systems with a TC or ESP function, by comparison, must be capable of building up a brake pressure in one or more wheel brakes, regardless of any actuation of the master cylinder by the driver, so as to eliminate the wheel slip occurring upon acceleration of the vehicle or on cornering. This requires pumps that are designed to be self-aspirating. Self-aspirating pumps are capable of pumping pressure fluid even if there is no pressure difference or only a slight pressure difference at their inlet side. An exemplary embodiment of a self-aspirating pump is already known for instance from German Patent Application DE 199 28 913 A1.

Regardless of the type of vehicle brake system, the pumps are preceded by hydraulic reservoirs. These reservoirs make pressure fluid available to the pumps and thereby assure pump startup. Known vehicle brake systems use spring piston reservoirs for this purpose. These reservoirs include a piston, guided movably in a reservoir housing, which by circumferential sealing divides a first storage chamber, which can be filled with pressure fluid, from a second storage chamber, which is filled with a gas. The piston is urged by a spring in the direction of its basic position. In this basic position, there is no pressure fluid in the first storage chamber. In known reservoirs, the inflow and outflow of pressure fluid take place through a common supply conduit. Such reservoirs are described for instance in German Patent Application DE 199 42 293 A1.

In the event of an emptied reservoir, to prevent pressure fluid aspirated from the master cylinder by the pump from flowing to the storage chamber, a check valve is disposed in the supply line to such a reservoir. Known check valves have a valve closing body, acted upon by a spring, for controlling a valve seat.

A defective, leaky check valve, in conjunction with the sole supply conduit of the reservoir, would have the effect that the underpressure generated by the self-aspirating pump could affect the wheel brakes. Because of this underpressure, the brake pistons of these wheel brakes will be put in an extreme position. In a subsequent braking event, a disproportionately large amount of pressure fluid would therefore have to be positively displaced into the wheel brakes for the sake of building up brake pressure. The driver could perceive this from a long pedal travel, which could be irritating with regard to the capability of the vehicle brake system to function.

Furthermore, the number of different components for vehicle brake systems with a variable functional scope increases the costs for development and maintenance of a modular system. In addition, relatively many individual components have to be installed to make the known vehicle brake systems, which adversely affects production costs and the resultant structural volume. Known vehicle brake systems furthermore have the potential for improvement in terms of their functional properties when brake slip regulation occurs.

OBJECT AND SUMMARY OF THE INVENTION

A hydraulic vehicle brake system according to the invention has the advantage over the prior art that it makes do with fewer different individual parts and is thus more economical. The individual parts used can be used both for anti-lock vehicle brake systems and for traction control or stability control programs. A vehicle brake system of the invention has improved functional properties during the regulation of the wheel slip, and because of the reduced number of individual parts, it makes more-compact dimensions of its hydraulic unit possible. These advantages are attained, among other ways, by the use of a self-aspirating pump for all the different kinds of vehicle brake systems, that is, including for purely anti-lock brake systems, in conjunction with hydraulic reservoirs that are each supplied with pressure fluid via an inlet and via an outlet separate from the inlet. The reservoirs used have a freely movable separator element, disposed between two end positions, for dividing a first storage chamber from a second storage chamber. Furthermore, this separator element is capable, in one of its end positions, of blocking off a pressure fluid-conducting connection from the inlet to the outlet of the reservoir. It functions without an additional spring element, and as a result, the volume of pressure fluid that can be stored in the storage chamber is increased, in comparison to a spring piston reservoir, while the dimensions are unchanged. Moreover, the reservoir has a pressure/volume characteristic curve with improved hysteresis, since the influence of the spring element on the hysteresis is eliminated. Further advantages or advantageous refinements of the invention will become apparent from the ensuing description.

A check valve of special embodiment is disposed in the outlet of the reservoir. This check valve prevents a return flow of pressure fluid to the storage chamber of the reservoir and, because of the additional sealing function of the separator element of the reservoir, it can also be embodied without a restoring spring. Besides the savings in terms of parts costs, the check valve thus is more compact and more economical, compared to known arrangements. Such a check valve is necessary only in vehicle brake systems with an electronic stability program or traction control, since in those cases a buildup of brake pressure can occur independently of the driver, and since for this pressure buildup, pressure fluid may under some circumstances have to be aspirated from the master cylinder by the pump. In that case, the check valve prevents pressure fluid coming from the master cylinder from flowing into the reservoir. Anti-lock vehicle brake systems make do without this check valve.

Alternative variant embodiments for a reservoir according to the invention, with a separator element that seals off in one end position are equally advantageous with respect to their small installation space and their costs.

An advantageous number and disposition of the inlets and outlets open into the first storage chamber of such a reservoir.

BRIEF DESCRIPTION OF THE DRAWINGS

The invention will be described in further detail in the ensuing description taken in conjunction with the drawings, in which.

DESCRIPTION OF THE PREFERRED EMBODIMENTS

Figure 1:
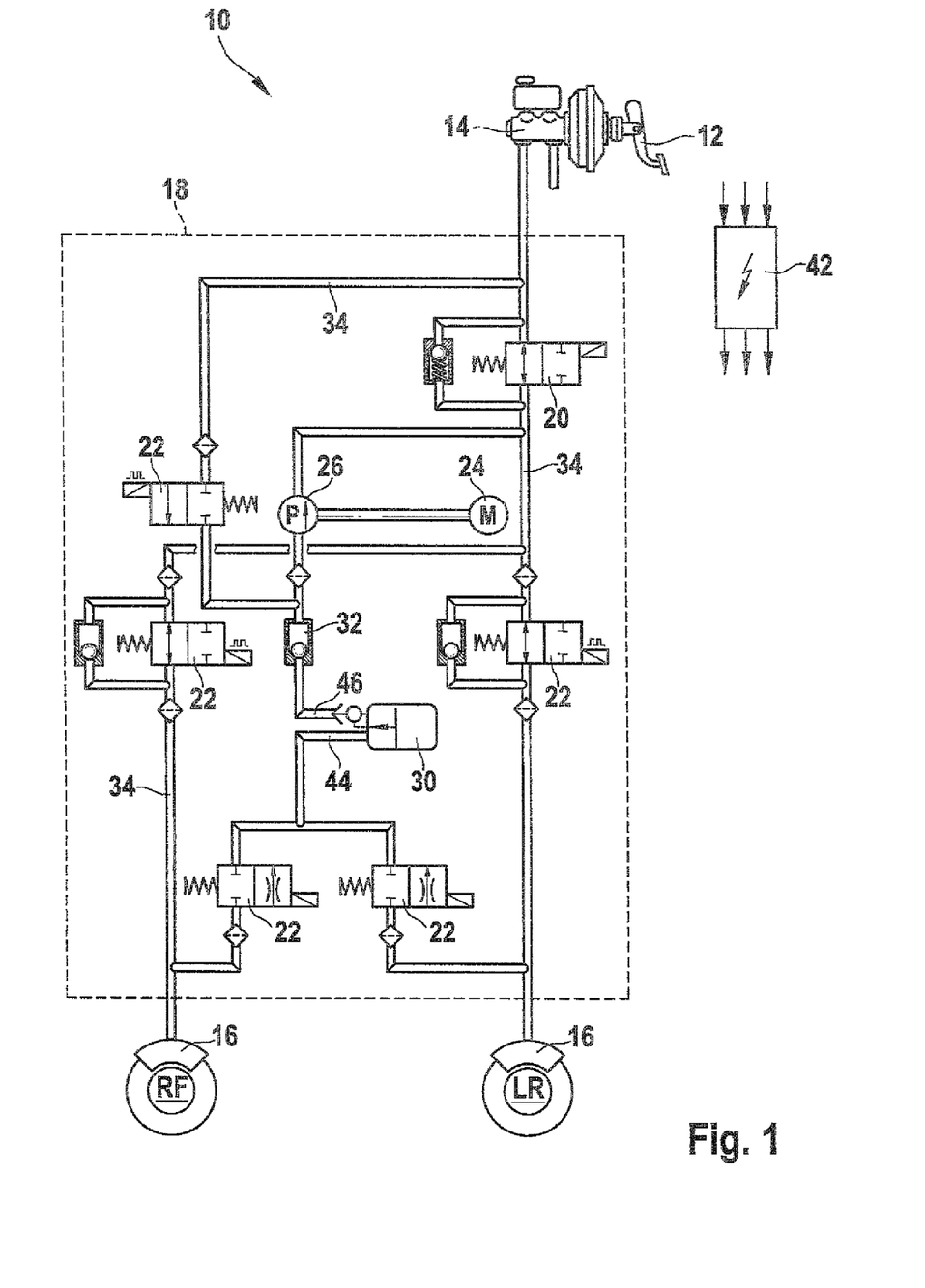
FIG. 1 is a hydraulic circuit diagram showing the layout of a hydraulic vehicle brake system according to the invention.

FIG. 1, in a schematic illustration, shows the circuit diagram of a hydraulic vehicle brake system 10 having a device for regulating wheel slip. A master cylinder 14 actuatable by a brake pedal 12 can be seen, along with two interconnected wheel brakes 16 in one brake circuit. A hydraulic unit 18 is disposed between the master cylinder 14 and the wheel brakes 16. This hydraulic unit 18 is shown in FIG. 1 by an outline shown in dashed lines. It includes various electromagnetically triggerable multi-way valves 20, 22, a pump 26 actuatable by a drive motor 24, a hydraulic reservoir 30 supplying the pump 26 with pressure fluid, and a check valve 32 located between the reservoir 30 and the pump 26. These hydraulic components mentioned are connected, on the basis of pressure fluid-carrying lines 34, to form a hydraulic circuit. These lines 34 are embodied as bores in a hydraulic block 40 (FIG. 2) of the hydraulic unit 18; in a later work operation, these bores are closed off from the outside. The aforementioned hydraulic components are also secured to the hydraulic block 40. For their electrical triggering, an electronic control unit 42 is present, which can likewise be disposed on the hydraulic block 40.

To this extent, this layout of a hydraulic vehicle brake system is prior art. For the mode of operation of this vehicle brake system, reference can therefore be made to the discussion in the brochure mentioned at the outset.

The invention is distinguished over the vehicle brake system explained in this brochure by the embodiment of the reservoirs 30 provided, the connection of these reservoirs 30 to the hydraulic circuits, and the structural embodiment of the check valves 32 employed. The modified embodiment of the reservoir 30 on which the invention is based can be seen in FIG. 1 from the switching symbol and will be made clear below in conjunction with the description of FIGS. 2 through 5. With regard to the connection of the reservoir 30 to the hydraulic circuit, it can be seen from FIG. 1 that a reservoir 30 according to the invention, for its supply with pressure fluid, now has at least one inlet 44 and at least one outlet 46 that is embodied separately from the inlet 44. As the check valve 32, which is disposed between the pump 26 and the reservoir 30, a check valve 32 without a restoring spring is used according to FIG. 1. The absent restoring spring is covered in the applicable claims by the wording "check valve with a freely movably received valve closing body".

Figure 2:
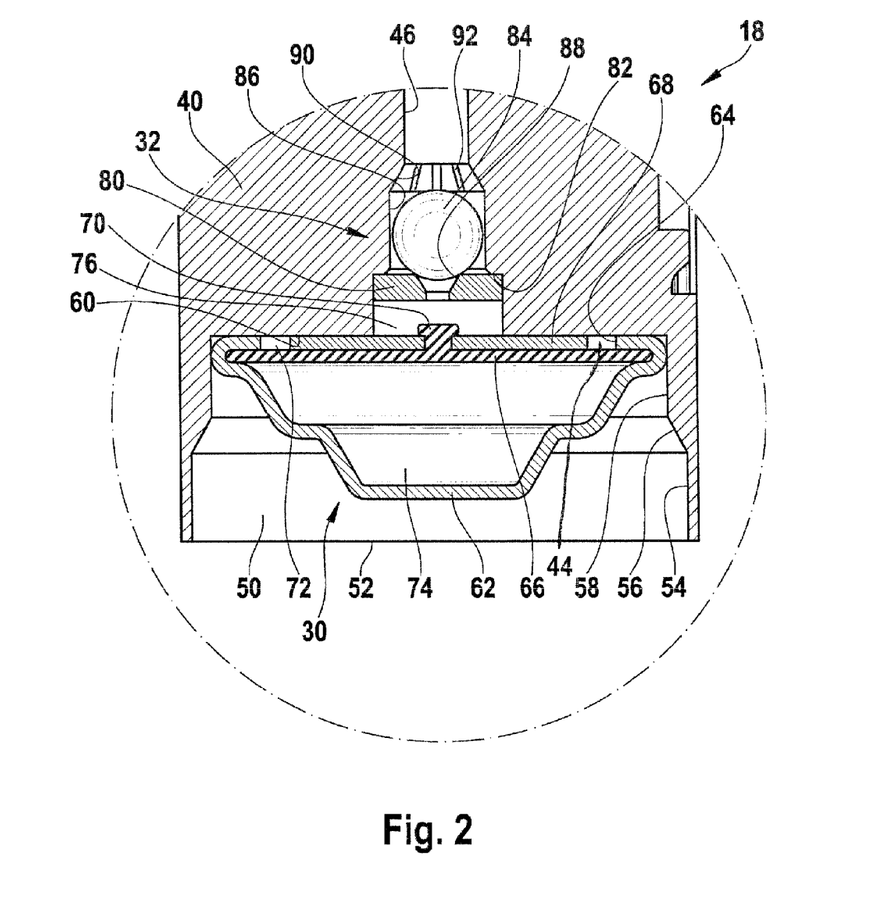
FIG. 2 shows a reservoir in a first, especially preferred structural valiant embodiment, in a hydraulic block of the hydraulic brake system.

FIG. 2 shows a detail of the aforementioned hydraulic block 40 of the hydraulic unit 18, with a reservoir 30 embodied according to the invention. The reservoir housing of this reservoir 30 is formed by the wall of a bore 50 which is stepped off multiple times from the outside inward and which leads from the underside 52 into the interior of the hydraulic block 40. The bore 50 is broken down into one outer cylindrical peripheral portion 54, an adjoining introduction portion 57 tapering conically inward, and an inner cylindrical fastening portion 58. This fastening portion 58 ends in a horizontally extending stop shoulder 60, in the center of which an outlet 46 discharges outward.

FIG. 2 shows a detail of the aforementioned hydraulic block 40 of the hydraulic unit 18, with a reservoir 30 embodied according to the invention. The reservoir housing of this reservoir 30 is formed by the wall of a bore 50 which is stepped off multiple times from the outside inward and which leads from the underside 52 into the interior of the hydraulic block 40. The bore 50 is broken down into one outer cylindrical peripheral portion 54, an adjoining introduction portion 56 tapering conically inward, and an inner cylindrical fastening portion 58. This fastening portion 58 ends in a horizontally extending stop shoulder 60, in the center of which the outlet 46 discharges outward.

A cup-shaped support element 62, which can for instance be made by deep-drawing from a sheet-metal blank, is press-fitted into the fastening portion 58. The opening 64 of the support element points in the direction of the outlet 46 and is completely covered by an elastic diaphragm 66 of pressure fluid-resistant material. This diaphragm 66 is crimped along its outer circumference to the support element 62, and the circumference of the support element 62 that is created by the crimping serves simultaneously to anchor this support element 62 by nonpositive engagement in the fastening portion 58. A sealing plate 68 rests on the outside, toward the outlet 46, of the diaphragm 66. This sealing plate is joined by positive engagement to the diaphragm 66, specifically with the aid of a knob 70 protruding in the direction of the outlet 46. The knob 70 penetrates a recess in the center of the sealing plate 68 and with its thickened head engages the recess from behind. The sealing plate 68 covers the cross section of the outlet 46 completely, but it has a smaller outer diameter compared to the inner diameter of an opening 64 in the support element 62. As a result, between the inner end of the crimping and the sealing plate 68, an annular chamber 72 is created, defined in the axial direction by the diaphragm 66 and the stop shoulder 60. It must be assumed that the at least one inlet 44 (FIG. 1) of the reservoir 30, arriving from the wheel brake 16 (FIG. 1), discharges into this annular chamber 72.

The diaphragm 66, together with the sealing plate 68, forms a separator element that is received freely movably in the support element 62 and that seals off a (second), gas-filled storage chamber 74, disposed in the interior of the support element 62, from a (first) storage chamber 76 that can be filled with hydraulic pressure fluid of the vehicle brake system. This first storage chamber 76 is located between the sealing plate 68 and the check valve 32, the check valve being placed axially spaced apart from the sealing plate 68 in the outlet 46 of the reservoir 30. It increases its volume when pressure fluid flows in, because the sealing plate 68 lifts from the stop shoulder 60 and moves into the interior of the support element 62. To a corresponding extent, the volume of the storage chamber 74 decreases.

The aforementioned check valve 32 comprises a valve seat part 80, in the form of a perforated disk which is press-fitted into the outlet 46 until it stops against a shoulder 82. The valve seat part 80 cooperates with a valve closing body 84, here shown in the form of a ball as an example. The ball is received freely movably, downstream of the valve seat part 80, in a cylinder portion 86 of the outlet 46 and controls a conically shaped valve seat 88 on the inside of the perforated disk. A constriction 90 of the outlet 46, embodied downstream of the cylindrical portion 86, forms the connection of the check valve 32 to an intake side of the pump 26 (see FIG. 1). At the constriction 90, star-shaped ribs or grooves 92 extending outward are preferably present, which assure a flow around the valve closing body 84 even whenever the valve closing body is in contact with the constriction 90. Accordingly, there can be a flow through the check valve 32 described only in the direction toward the pump 26, while this check valve blocks off the flow in the opposite direction, toward the reservoir 30.

The view in FIG. 2 shows the reservoir 30 with the first storage chamber 76 emptied. Accordingly, the freely movable separator element (diaphragm 66) assumes its first end position. In that position, the sealing plate 68 rests on the stop shoulder 60 of the bore 50 and seals off the inlet 44 from the outlet 46. Underpressure, generated by the self-aspirating pump 26 connected to the outlet 46, can as a result not reach the inlet 44 and thus cannot reach the wheel brakes 16 connected to it. The aspirating pump 26 is accordingly supplied with pressure fluid from the master cylinder 14 only via the opened multi-way valve 20 (FIG. 1). The check valve 32 described prevents pressure fluid under pressure, in the event of pedal actuation during an ongoing traction control operation, from flowing into the reservoir 30 from the master cylinder 14 when the valve 20 is open.

Figure 3:
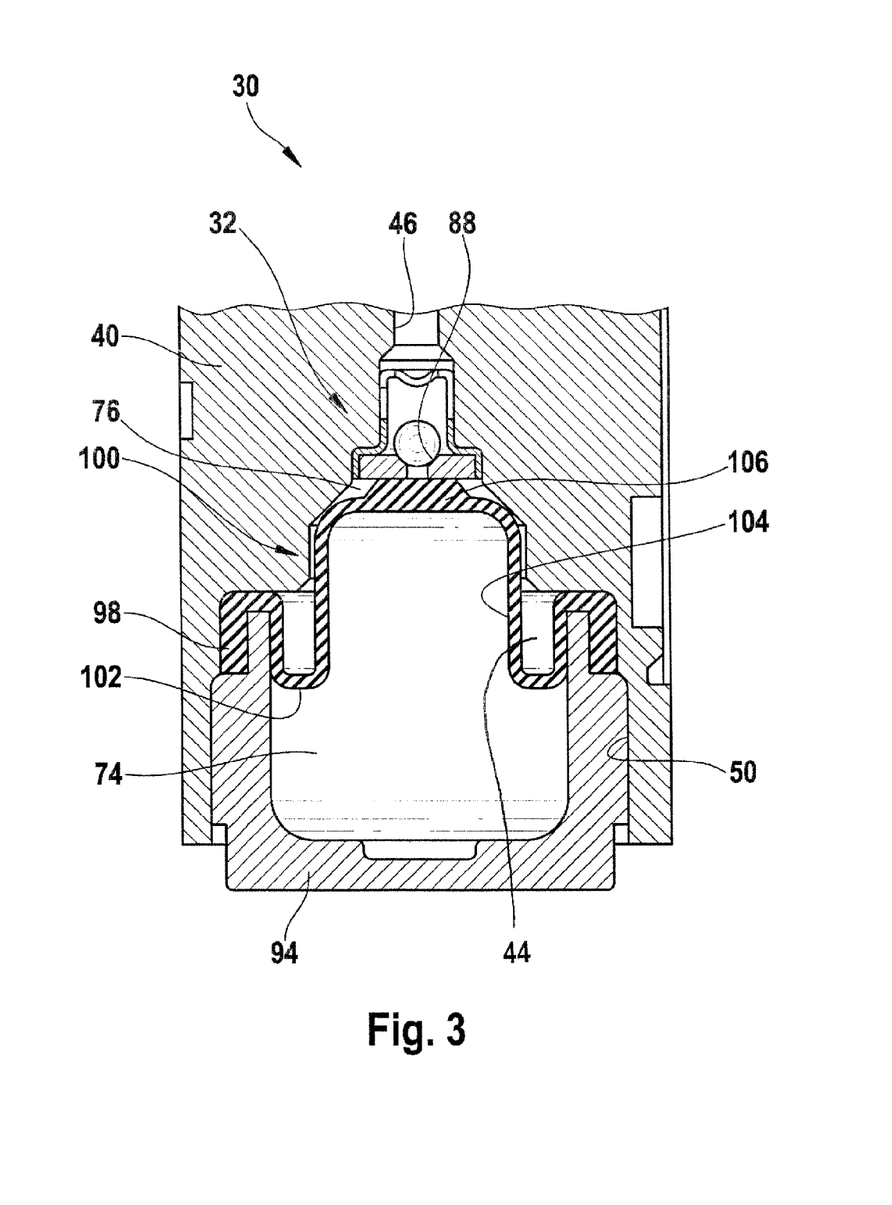
FIG. 3 shows second embodiment of a reservoir according to the invention.

FIG. 3 shows an alternative embodiment of a reservoir 30. Its reservoir housing is again formed by the wall of a bore 50, open toward the outside, of the hydraulic block 40. This reservoir 30 includes a cup-shaped support element 94, which is press-fitted with its open end leading into the bore 50. The support element 94 is recessed in its outer diameter in the region of its opening, and as a result an annular chamber is created between the circumference of the support element 94 and the inner wall of the bore 50. In this annular chamber is a sealing portion 98 of a roll diaphragm 100; the sealing portion encircles the circumference of the support element 94. This roll diaphragm 100 is as a result held in the hydraulic block 40 by positive engagement between the support element 94 and the inner wall of the bore 50. It covers the entire opening of the support element 94, forming a diaphragm fold 102, which extends into the hollow interior of the support element 94, and a central portion 104, which integrally adjoins the diaphragm fold 102. With its central portion 104, the roll diaphragm 100 protrudes axially relative to the encircling sealing portion 98, and on the face end of its central portion 104, it has a control cross section 106. This separator element (or roll diaphragm 100) divides a gas-filled (second) storage chamber 74, enclosed between it and the support element 94, from a first storage chamber 76 that can be filled with pressure fluid. The first storage chamber 76 is located between the roll diaphragm 100 and a check valve 32 disposed in the outlet 46. The check valve used is essentially equivalent in its embodiment to the check valve 32 described in conjunction with FIG. 2. One difference is that the check valve 32 here is embodied as a component unit, with its own valve housing, that can be anchored in the hydraulic block 40. Upstream of the valve closing body 84, the valve housing is provided with openings, through which, when the valve seat 88 is open, pressure fluid can flow past the valve closing body 84 to the outlet 46.

The roll diaphragm 100 is likewise received freely movably between two end positions. In the first end position, shown, the pressure fluid-filled first storage chamber 76 has been emptied completely. The roll diaphragm 100 now rests with its control cross section 106 on the side of the valve seat part 80 diametrically opposite the valve seat 88 of the check valve 32. Thus the roll diaphragm 100 seals off the inflow cross section of the check valve 32 and blocks any communication from the inlet 44 of the reservoir 30 to the outlet 46. The inlet 44 cannot be seen in FIG. 3, but it opens into the region of the diaphragm fold 102. Consequently, here as well, the buildup of the underpressure effected by the driven pump 26 connected to the outlet 46 in the wheel brakes 16 contacted by the inlet 44 is prevented.

Figure 4:
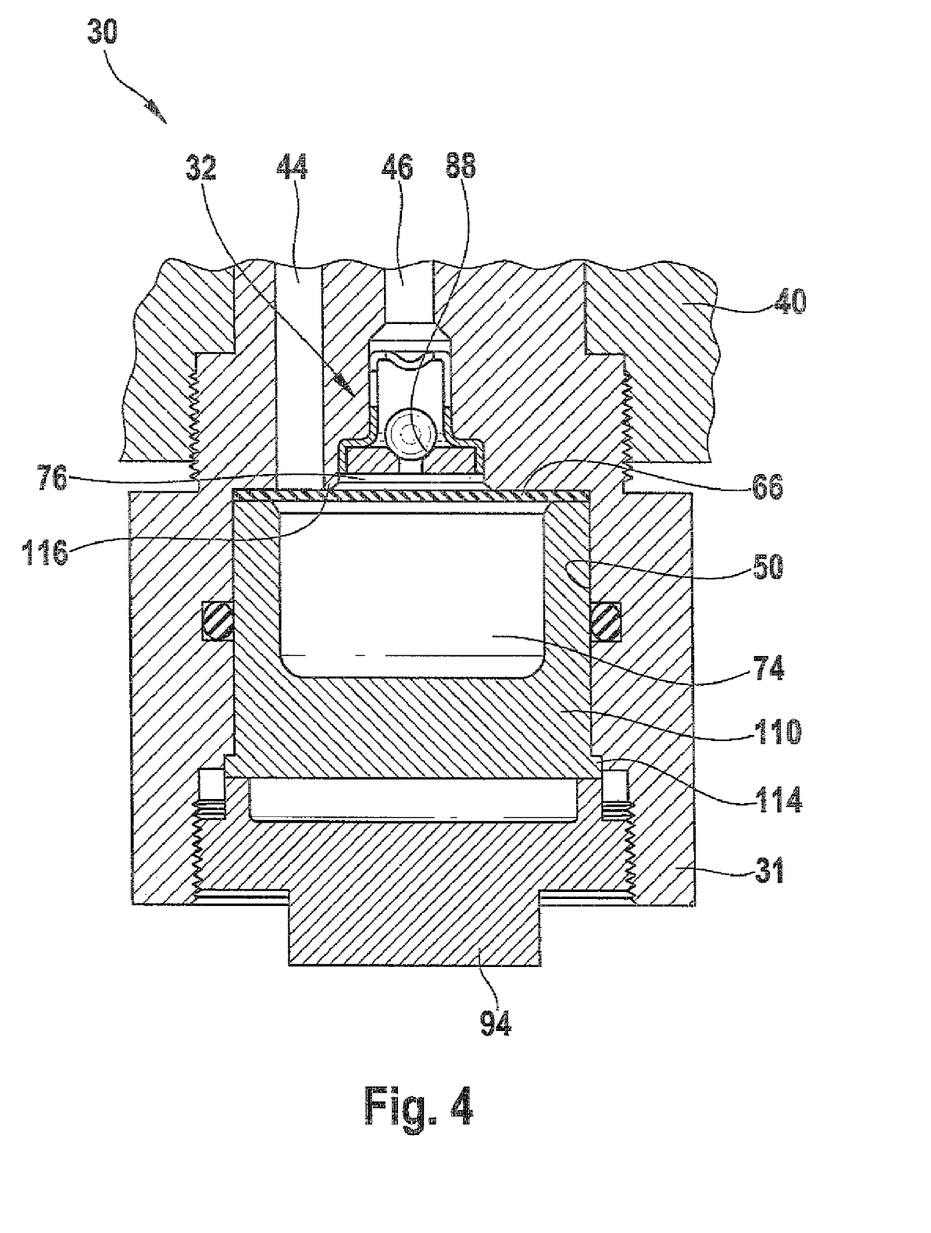
FIG. 4 shows a third embodiment of a reservoir embodied as a screw-on version.

In the exemplary embodiment of FIG. 4, the reservoir 30 is embodied as a screw-on version. For this purpose, its reservoir housing 31 is embodied as a separate component that is screwed into the hydraulic block 40. In the reservoir housing 31, a cylindrical bore 50 receives a hollow piston 110. This piston is installed, with its opening leading, until it comes to a stop in the reservoir housing 31. This opening in the hollow piston 110 is spanned by a diaphragm 66, which rests on the face end of the wall 112 surrounding the opening. The hollow piston 110, on its end remote from the diaphragm 66, is provided with a radially protruding collar 114. This collar 114 rests on an inversely shaped recess in the bore 50. A closure stopper 94, which can be screwed into the bore 50 from outside, exerts an axial force on the hollow piston 110. As a result of the screwing-in torque of the closure stopper 94, the diaphragm 66 is fixed between the hollow cylinder and the stop shoulder 60 (FIG. 2) of the bore 50. The inlet 44 and the outlet 46 of this reservoir 30 extend parallel to one another in the screw-in stub of the reservoir housing 31. The result at its orifice into the bore 50 is a rib 116, which cooperates with the diaphragm 66. The view in FIG. 4 shows the diaphragm 66 in one end position again. The diaphragm 66 acts as a separator element between the two storage chambers 74 and 76 and simultaneously, in the end position shown, blocks off the communication from the inlet 44 to the outlet 46. In this exemplary embodiment again, a check valve 32 with a freely movable valve closing body 84 is located in the outlet 46, as has already been disclosed in conjunction with FIG. 2.

Figure 5:
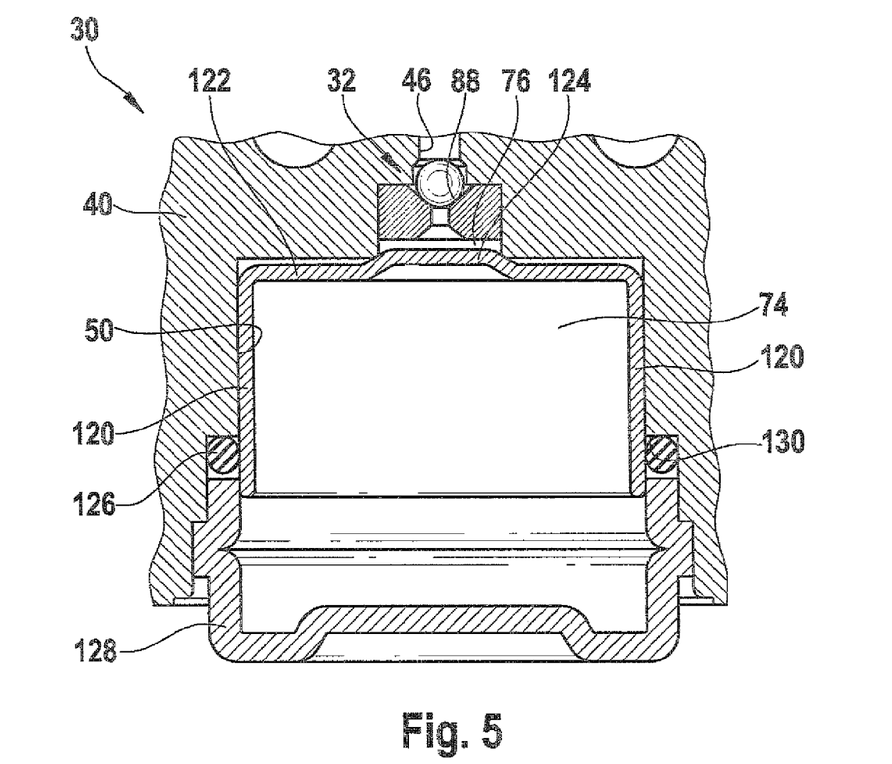
FIG. 5 shows a further exemplary embodiment of a reservoir, in which a hollow piston is used as a separator element.

FIG. 5 shows a further exemplary embodiment of a reservoir 30, in which a hollow piston 120 is used as the separator element. This piston 120 is made from thin-walled, rigid material and has a piston bottom 122 with a centrally protruding protrusion 124. The hollow piston 120 is guided movably in a bore 50 and is sealed off on its circumference by a conventional sealing element 126, such as an O-ring or a quad ring. The installation direction of the piston 20 is such that the piston bottom 122 is oriented toward the outlet 46 of the reservoir 30, and the open end of the piston 120 points in the direction of the opening of the bore 50 of the hydraulic block 40. This opening is closed by a closure cap 128. The closure cap 128 is embodied as cup-shaped, and its inside diameter is equivalent to the inside diameter of the bore 50 of the hydraulic block 40. As a result, the piston 120 can penetrate into the interior of the closure cap 128. The end face, located inside the reservoir 30, of the closure cap 128, together with an axial shoulder 130 of the hydraulic block 40, keeps the sealing element 126 that seals off the piston 120 in position. The closure cap 128 can be held on the hydraulic block 40 by nonpositive engagement, such as press-fitting, or positive engagement, such as calking.

In this exemplary embodiment, the rigid piston 120 acts as a separator element between two storage chambers 74 and 76. The first storage chamber 76, which can be filled with the hydraulic pressure fluid of the vehicle brake system, is embodied between the piston bottom 122 and the check valve 32; the second, gas-filled storage chamber 74 is defined by the interior of the piston 120 and by the closure cap 128. In the position shown, the first storage chamber 76 has essentially been emptied of hydraulic pressure fluid, and as a result, the piston 120 with the protrusion 124 from its piston bottom 122 seals off the inflow cross section of the check valve 32. Since in this exemplary embodiment as well it must be assumed that the inlet 44, not shown, discharges into the first storage chamber 76, the piston 120 in the end position shown thus also blocks off the pressure fluid-conducting connection from the inlet 44 to the outlet 46.

Figure 6:
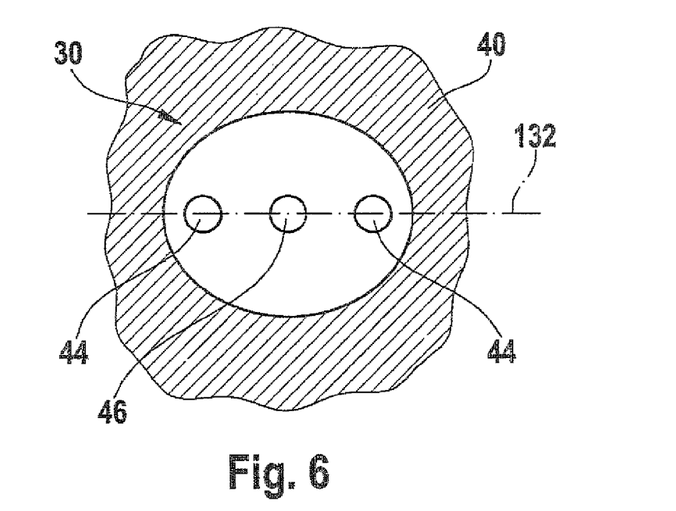
FIG. 6 shows a cross section through a reservoir, specifically in the region of the entering and leaving supply conduits.

FIG. 6 shows the relative position of the inlets and outlets 44, 46 of a reservoir 30 in a cross section through the reservoir 30 in the region of the orifice cross sections of these conduits. A total of three orifice cross sections can be seen in FIG. 6, of which two form inlets 44 and one forms an outlet 46. The outlet 46 is located in the center of the cross sections shown; the two inlets 44 are placed symmetrically to both sides of this outlet 46. All three orifice cross sections are located on a common line 132.

For bleeding the vehicle brake system 10 in FIG. 1, pressure fluid under pressure is fed into the various lines 34 via the connection of a wheel brake 16. Via the electronic control unit 42, the multi-way valves 22, which are closed in their basic position, are triggered and switched to their open position. The fed-in pressure fluid flows into the storage chamber 76 via the inlet 44 and causes a deflection of the respective separator element 66; 100; 110; 120 into the second end position, not shown. In the process, the separator element 66; 100; 110; 120 opens a communication from the inlet 44 to the outlet 46 of the reservoir 30, so that the pressure fluid flows onward in the direction of the pump 26, via the check valve 32 that is open in the flow direction. The pressure fluid flow branches off upstream of a pump 26 into a first branch, which leads to the master cylinder 14 via the triggered multi-way valve 22, and a second branch, which also leads to the master cylinder 14, but through the non-triggered multi-way valve 20. Hence there are no regions of the vehicle brake system 10 through which pressure fluid does not flow.

The foregoing relates to the preferred exemplary embodiments of the invention, it being understood that other variants and embodiments thereof are possible within the spirit and scope of the invention, the latter being defined by the appended claims.

The invention claimed is:

1. A hydraulic vehicle brake system, having a service brake that which can be actuated by muscle force and having a device for regulating wheel slip, comprising a master cylinder, at least one wheel brake, and a hydraulic unit connected between the master cylinder and the wheel brake, the hydraulic unit having electromagnetically triggerable multi-way valves, at least one pump, a drive for the pump, at least one reservoir for supplying the pump with pressure fluid, an electric motor actuating the drive for the pump, and an electronic control unit for triggering the multi-way valves and/or the electric motor to suit demand, wherein the at least one pump is a self-aspirating pump; the at least one reservoir has a separator element which divides a first storage chamber, which can be filled via at least one inlet and emptied via at least one outlet separated from the inlet, from a second storage chamber, and the separator element is disposed freely movably between two end positions and is disposed without a spring element, and in one of the two end positions the separator element blocks a pressure fluid-conducting connection of the inlet with the outlet.

2. The hydraulic vehicle brake system as defined by claim 1, further comprising a check valve provided in the outlet of the reservoir, the check valve having a freely movably received valve closing body for controlling a valve seat located toward the first storage chamber, and downstream of the valve closing body the check valve has means which permit a flow of pressure fluid around the valve closing body.

3. The hydraulic vehicle brake system as defined by claim 2, wherein the separator element is formed by a roll diaphragm, which by forming at least one diaphragm fold in the roll diaphragm closes an opening of a cup-shaped diaphragm support, the roll diaphragm having sealing portions for sealing off the second storage chamber from the first storage chamber, for sealing off the second storage chamber from the environment, and for sealing off the inlet of the reservoir from the outlet.

4. The hydraulic vehicle brake system as defined by claim 3, wherein the roll diaphragm and the diaphragm support form a pre-assembleable structural unit, which is received in a receptacle in the hydraulic block of the hydraulic unit, which receptacle adjoins the first storage chamber.

5. The hydraulic vehicle brake system as defined by claim 2, wherein the second storage chamber is defined by a cup-shaped support element which has an opening that is spanned by a diaphragm, the diaphragm, on its side toward the first storage chamber, having a sealing plate which covers a cross section of the outlet.

6. The hydraulic vehicle brake system as defined by claim 5, wherein the support clement along with the diaphragm is received as a pre-assembleable structural unit n a receptacle in the hydraulic block of the hydraulic unit, which receptacle adjoins the first storage chamber.

7. The hydraulic vehicle brake system as defined by claim 2, wherein the separator element is formed by a hollow piston, the hollow piston being guided freely movably in a receptacle on the hydraulic block of the hydraulic unit, which receptacle adjoins the first storage chamber.

8. The hydraulic vehicle brake system as defined by claim 2, wherein the reservoir is supplied with pressure fluid via two inlets and one outlet, and the inlets and the outlet are located side by side on a common line, the outlet being disposed between the two inlets.

9. The hydraulic vehicle brake system as defined by claim 1, wherein the second storage chamber is defined by a cup-shaped support element which has an opening that is spanned by a diaphragm, the diaphragm, on its side toward the first storage chamber, having a sealing plate which covers a cross section of the outlet.

10. The hydraulic vehicle brake system as defined by claim 9, wherein the support element along with the diaphragm is received as a pre-assembleable structural unit in a receptacle in the hydraulic block of the hydraulic unit, which receptacle adjoins the first storage chamber.

11. The hydraulic vehicle brake system as defined by claim 9, wherein the reservoir is supplied with pressure fluid via two inlets and one outlet, and the inlets and the outlet are located side by side on a common line, the outlet being disposed between the two inlets.

12. The hydraulic vehicle brake system as defined by claim 1, wherein the separator element is formed by a roll diaphragm, which by forming at least one diaphragm fold in the roll diaphragm closes an opening of a cup-shaped diaphragm support, the roll diaphragm having sealing portions for sealing off the second storage chamber from the first storage chamber, for sealing off the second storage chamber from the environment, and for sealing off the inlet of the reservoir from the outlet.

13. The hydraulic vehicle brake system as defined by claim 12, wherein the roil diaphragm and the diaphragm support form a pre-assembleable structural unit, which is received in a receptacle in the hydraulic block of the hydraulic unit, which receptacle adjoins the first storage chamber.

14. The hydraulic vehicle brake system as defined by claim 12, wherein the reservoir is supplied with pressure fluid via two inlets and one outlet, and the inlets and the outlet are located side by side on a common line, the outlet being disposed between the two inlets.

15. The hydraulic vehicle brake system as defined by claim 1, wherein the separator element is formed by a hollow piston, the hollow piston being guided freely movably in a receptacle on the hydraulic block of the hydraulic unit, which receptacle adjoins the first storage chamber.

16. The hydraulic vehicle brake system as defined by claim 15, wherein the reservoir is supplied with pressure fluid via two inlets and one outlet, and the inlets and the outlet are located side by side on a common line, the outlet being disposed between the two inlets.

17. The hydraulic vehicle brake system as defined by claim 1, wherein the reservoir is supplied with pressure fluid via two inlets and one outlet, and the inlets and the outlet are located side by side on a common line, the outlet being disposed between the two inlets.

* * * * *

UNITED STATES PATENT AND TRADEMARK OFFICE
CERTIFICATE OF CORRECTION

| | | |
|---|---|---|
| PATENT NO. | : 8,042,884 B2 | Page 1 of 1 |
| APPLICATION NO. | : 12/303787 | |
| DATED | : October 25, 2011 | |
| INVENTOR(S) | : Andreas Weh et al. | |

It is certified that error appears in the above-identified patent and that said Letters Patent is hereby corrected as shown below:

Column 8, Line 28 Claim 1: Correct "ofthe" to "of the".

Column 8, Line 58 Claim 6: Correct "n" to "in".

Column 10, Line 2 Claim 13: Correct "roil" to "roll".

Signed and Sealed this
Twenty-seventh Day of December, 2011

David J. Kappos
*Director of the United States Patent and Trademark Office*